Figures 1A, 1B:
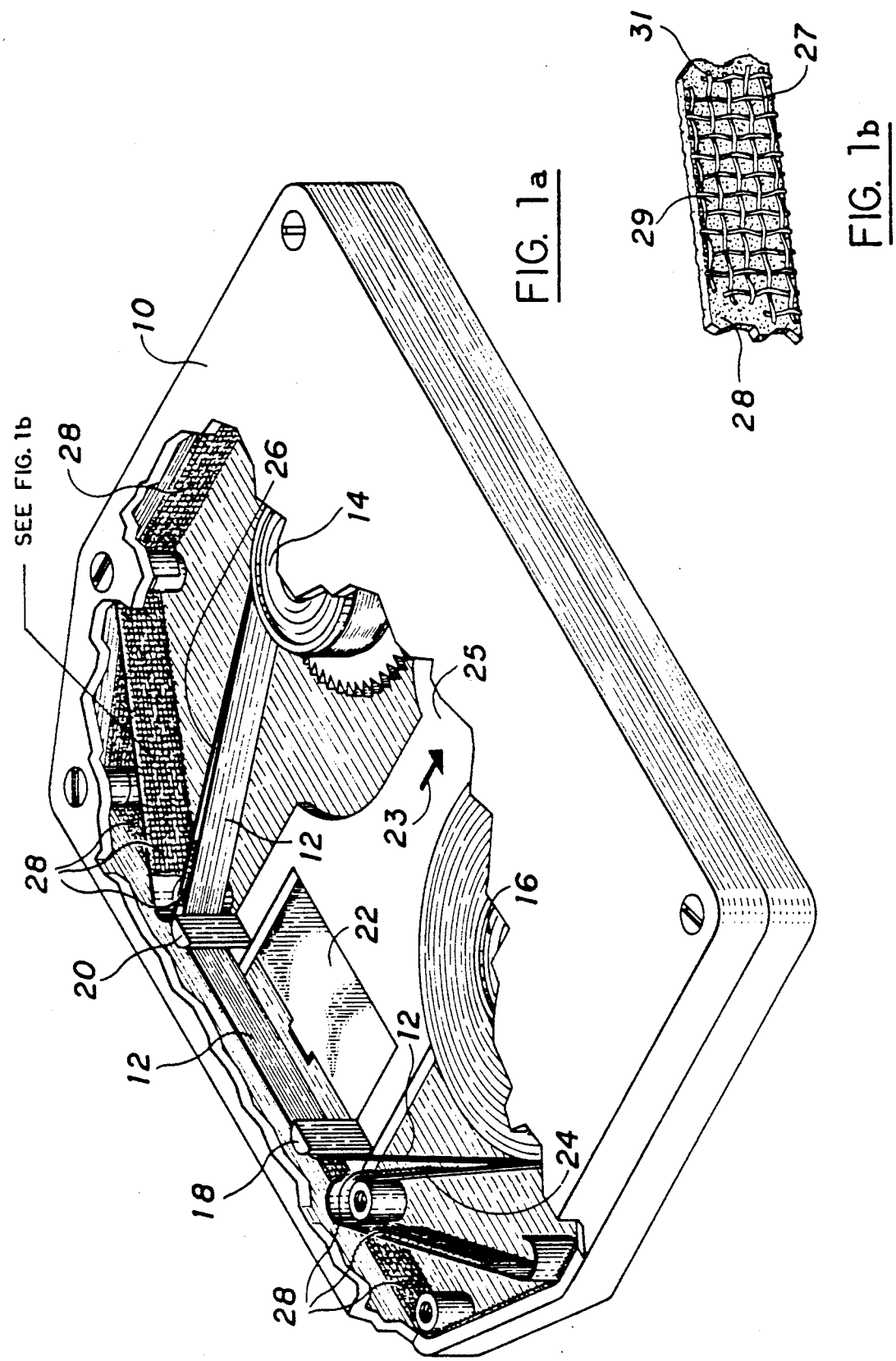

United States Patent [19]

Karsh

[11] Patent Number: 5,019,933
[45] Date of Patent: May 28, 1991

[54] DEBRIS CONTROL IN AN ENCLOSED MAGNETIC TAPE CARTRIDGE

[75] Inventor: Herbert Karsh, Laguna Beach, Calif.
[73] Assignee: Eastman Kodak Company, Rochester, N.Y.
[21] Appl. No.: 440,924
[22] Filed: Nov. 24, 1989
[51] Int. Cl.⁵ ............................................. G11B 23/02
[52] U.S. Cl. ............................ 360/132; 15/DIG. 13
[58] Field of Search ............... 360/132, 128; 242/199; 15/DIG. 12–13

[56] References Cited

U.S. PATENT DOCUMENTS 4,905,112  2/1990  Rhodes ................................. 360/132

Primary Examiner—John H. Wolff
Attorney, Agent, or Firm—Dennis P. Monteith

[57] ABSTRACT

In order to diminish the effects of debris on recording and playback in a cartridge loaded recorder, adhesive material is placed inside the enclosed magnetic tape cartridge. The adhesive is placed on appropriate interior walls and other available surfaces of the cartridge, and is covered by a protective screen having holes through which the debris may pass. The size of the holes is large relative to the debris size. The adhesive material is located clear of the magnetic tape path, magnetic heads and guides, and if an inadvertent tape loop occurs in the cartridge, the protective screen insures that the magnetic tape cannot come into contact with the adhesive proper. Any losse debris, however, incident on the holes of the protective screen is captured and immobilized by sticking to the adhesive material.

1 Claim, 1 Drawing Sheet

DEBRIS CONTROL IN AN ENCLOSED MAGNETIC TAPE CARTRIDGE

BACKGROUND OF THE INVENTION

1. Field of the Invention

This invention relates to a magnetic tape cartridge, and in particular to control of debris within a magnetic tape cartridge.

2. Description Relative to the Prior Art

An important reason for the use of an enclosed cartridge in the magnetic recording art is to protect the magnetic tape from particles, dust and debris present in the environment. Such particles when adherent to the tape during recording or playback result in dropout and loss of signal due to separation of the tape surface from the magnetic head. While the tape is protected from the outside environment by the enclosed cartridge, by the same token, detritus such as magnetic oxide particles from the magnetic coating, conductive particles from the backside of the tape, and metal or ferrite particles due to head wear, are retained within the cartridge. The presence of these particles is similarly detrimental to recorder operation in causing dropouts, signal loss, and accelerated head wear due to abrasion.

SUMMARY OF THE INVENTION

In order to diminish the effects of debris on recording and playback in a cartridge loaded recorder, adhesive material is placed inside the enclosed magnetic tape cartridge. The adhesive is placed on appropriate interior walls and other available surfaces of the cartridge, and is covered by a protective screen having holes through which the debris may pass. The size of the holes is large relative to the debris size. The adhesive material is located clear of the magnetic tape path, magnetic heads and guides, and if an inadvertent tape loop occurs, the protective screen insures that the magnetic tape cannot come into contact with the adhesive proper. Loose debris, however, incident on the holes of the protective screen is captured and immobilized by sticking to the adhesive material.

DESCRIPTION OF THE INVENTION

The invention will be described with respect to the figures of which:

FIG. 1a is a perspective view of a magnetic tape cartridge showing a screen protected adhesive located therein in accordance with the invention, and FIG. 1b is an enlarged view of a portion of the screen protected adhesive of FIG. 1a.

Referring to FIG. 1a, a magnetic tape cartridge 10 of the type disclosed in co-pending application U.S. Ser. No. 352,431 comprises an enclosure containing magnetic tape 12 spooled onto reels 14 and 16. The cartridge 10 is shown in its parked configuration, which is the configuration assumed when the cartridge 10 is out of its associated tape transport. The tape 12 is wound oxide side in and in the parked configuration passes over tape lifters 18, 20 which support the tape 12 along a path crossing a door covered aperture 22 in the bottom of the cartridge 10. When the cartridge 10 is inserted into an associated recorder, the door covering the aperture 22 is withdrawn, allowing the magnetic head and guides of the associated recorder to enter the cartridge. At that time the tape lifters 18, 20 are withdrawn from contact with the magnetic tape 12 by motion of the plate 25 in the direction of the arrow 23. The magnetic tape 12 then wraps the magnetic head and the tape guides, and the cartridge 10 is ready for operation. Included in the cartridge 10 are tight winders 24, 26 for squeegeeing air from the tape as it is wound onto the reels 14, 16. It will be appreciated that when the aperture 22 is covered by its door, and the top cartridge cover is in place, the cartridge 10 is totally enclosed and loose debris in the cartridge 10 will be retained within the cartridge 10.

In the practice of the invention a suitable adhesive material is placed inside the cartridge 10. A convenient material for providing the adhesive surface is the double coated adhesive tape 28 manufactured by the 3M Company, St. Paul, Minn. The adhesive tape 28 may be placed on the walls of the enclosure or on the surfaces, say, of the tight winders 24, 26; the only restriction being that the double coated tape 28 not contact the magnetic tape 12. Referring to FIG. 1b, to insure non-contact between the magnetic tape 12 and the adhesive tape 28 under all conditions, a plastic mesh screen 27 having holes 29 covers the adhesive tape 28. The holes in the mesh screen 28 are approximately 0.050" squares, and the strands 31 of the mesh are approximately 0.015" in diameter. The mesh screen 27 is thick enough, i.e. 0.015", to insure that the thin layer of adhesive on the adhesive tape 28 is well below the exposed surface of the mesh screen 27.

The invention has been described in detail with particular reference to preferred embodiments thereof, but it will be understood that variations and modifications can be effected within the spirit and scope of the invention.

What is claimed is:

1. A magnetic tape cartridge containing (1) a pair of rotatable reels for transporting tape from one reel to the other reel, and (2) a material having a sticky surface exposed for holding debris that comes in contact with said sticky surface, the improvement comprising:

a protective mesh screen covering said sticky surface of said material to prevent the magnetic tape from contacting said stick surface while exposing sufficient area of said sticky surface for capturing debris.

* * * * *